Feb. 17, 1959 C W. MUSSER ET AL 2,873,648
REMOTE CONTROL FLUID PRESSURE RESPONSIVE ACTUATOR
Filed May 7, 1953 3 Sheets-Sheet 1
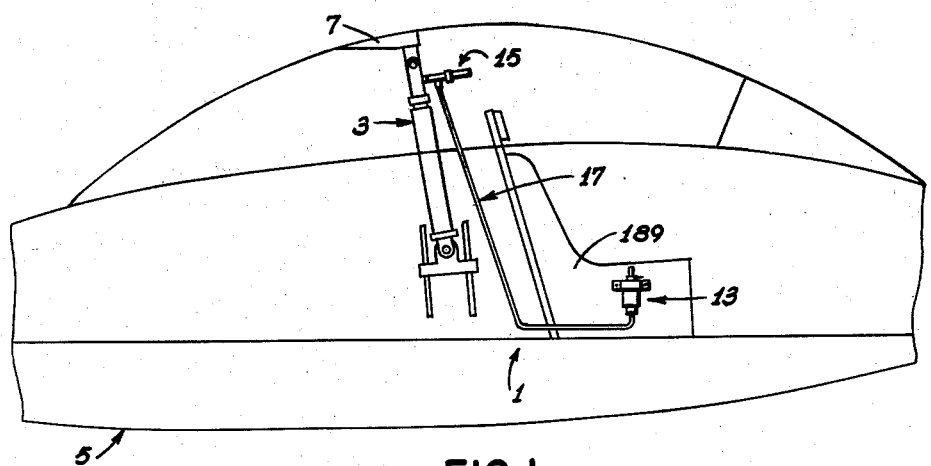
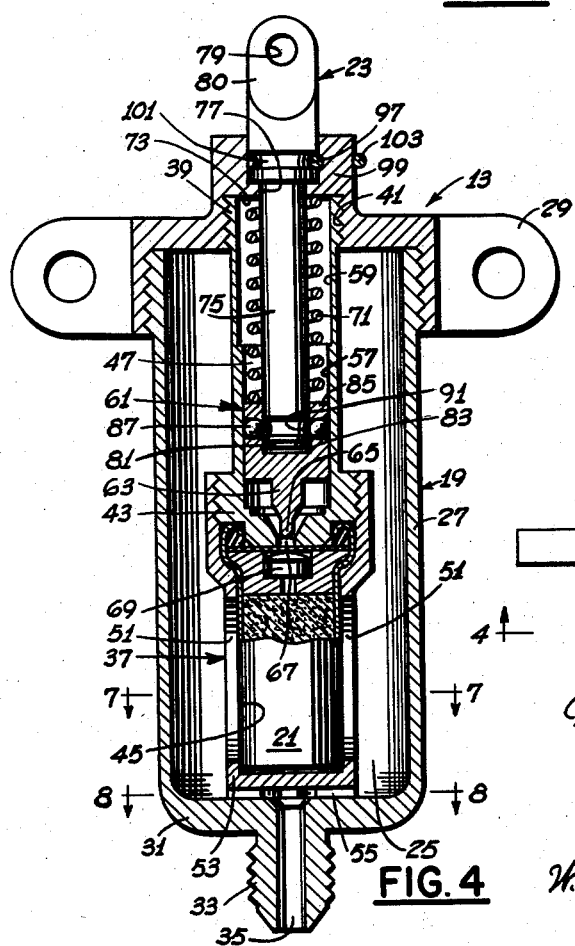
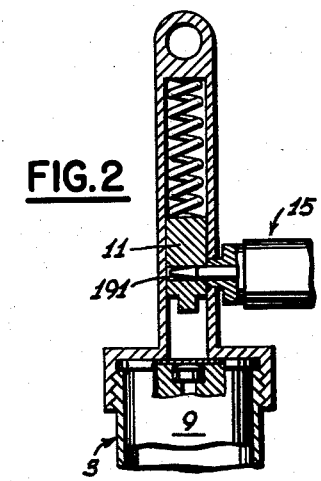
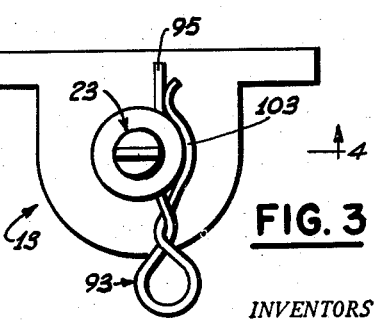
INVENTORS
C WALTON MUSSER
FRANCIS W. DIETSCH
BY W. E. Thibodeau, A. W. Dew
and H. I. Forman
ATTORNEYS

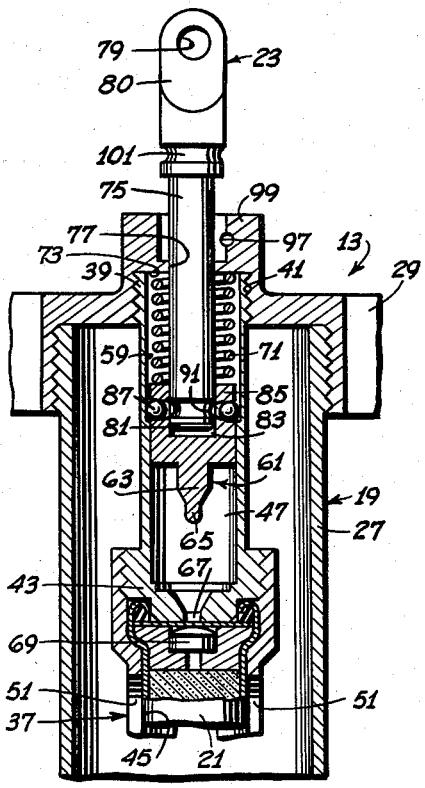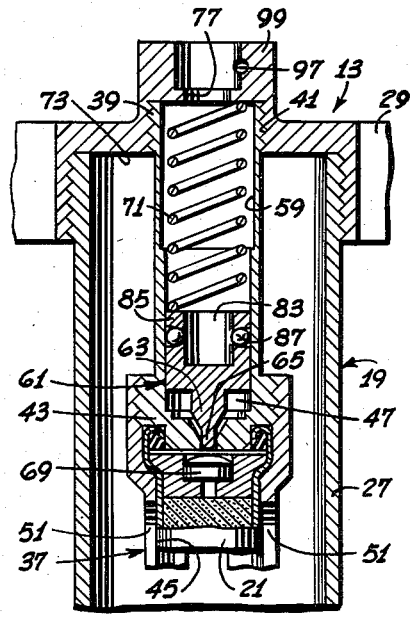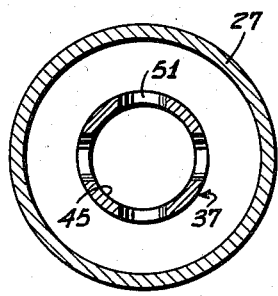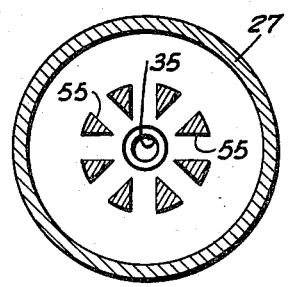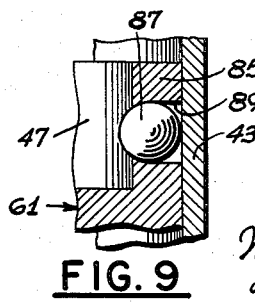

Feb. 17, 1959  C W. MUSSER ET AL  2,873,648
REMOTE CONTROL FLUID PRESSURE RESPONSIVE ACTUATOR
Filed May 7, 1953  3 Sheets-Sheet 3

INVENTORS
C WALTON MUSSER
FRANCIS W. DIETSCH
BY
W. E. Thibodeau, A. W. Dew
and H. I. Forman
ATTORNEYS:

United States Patent Office 2,873,648
Patented Feb. 17, 1959

2,873,648

REMOTE CONTROL FLUID PRESSURE RESPONSIVE ACTUATOR

C Walton Musser and Francis W. Dietsch, Philadelphia, Pa., assignors to the United States of America as represented by the Secretary of the Army Application May 7, 1953, Serial No. 353,702

2 Claims. (Cl. 89—1)

(Granted under Title 35, U. S. Code (1952), sec. 266)

The invention described herein may be manufactured and used by or for the Government for governmental purposes without the payment of any royalty thereon.

The present invention relates to a system for initiating operation of a mechanical device from a remote position and more particularly to a remote control, fluid pressure responsive actuator.

In many apparatus installations, the difficulty of initiating operation of the apparatus from a remote location has presented many problems, particularly where quick and positive control is required. For example, in certain types of airplanes, in cases where hasty exit of personnel must be effected because of an emergency, canopy removers and personnel catapult devices are employed which are mechanically controlled. The apparatus useful therefor is usually located in a remote, out-of-the-way position from the operator. The best systems heretofore employed for initiating operation of such canopy removers and catapults have used cables and pulleys to connect an operating handle located on the seat occupied by an operator with the firing mechanism of the canopy remover or the catapult. In modern aircraft, this requires a devious path for the operating cable and, consequently, the system is quite complicated. In many cases, it is almost impossible to make a satisfactory device to initiate simultaneous operation of more than one apparatus since, every time the operating cable changes direction, a pulley or a bell crank has to be used, with a considerable loss in mechanical advantage. In addition, these arrangements not only require frequent adjustments to be made but also are subject to jamming and mechanical failure and require excessive forces to operate them.

Therefore, a primary object of the present invention is to provide an improved system for initiating operation of an apparatus remotely disposed from the operator thereof.

Another object of the present invention is to provide a remote control actuator which will overcome the above as well as other disadvantages of like, prior art apparatus.

Still another object of the present invention is to provide a system for initiating operation of a mechanical device which is simple and easy to operate and which is less subject to mechanical failure.

A further object of the present invention is to provide a system for initiating operation of a mechanical device which is readily adapted to limited space requirements for its accommodation.

Also, it is an object of the present invention to provide a remote control actuator for initiating operation of a mechanical device which is fluid pressure responsive and which is more positive in operation than other mechanically operated devices of like kind.

An additional object is to provide an improved initiator for originating the fluid pressure necessary to operate a remote control device of the present invention.

Still further, it is an object to provide an improved exactor or fluid pressure responsive device for initiating operation of the apparatus to which the remote control actuator of the present invention is applied.

It is still another object of the present invention to provide a remote control, fluid pressure responsive actuator which is relatively simple in construction, economical to manufacture and which is highly efficient and easy to operate.

In accordance with the present invention, there is provided a system for initiating operation of a mechanical device which comprises an initiator or detonating means for generating a fluid pressure, an exactor or fluid pressure responsive means adapted for connection operatively with the mechanical device and fluid pressure directing means connected between the initator and exactor. The initiator comprises a walled enclosure in which are mounted explosive means and manually-operated trigger means for detonating the explosive means. The directing means is connected with the walled enclosure and with an opening provided therein through which fluid pressure, generated by the explosive means, is transmissible. The exactor comprises a walled enclosure defining a pressure chamber within which is mounted a piston. An operating rod for initiating operation of the mechanical device is attached to the piston. Pressure responsive locking means is operatively connected with the operating rod to normally secure the operating rod against movement. The directing means is connected with an aperture provided in the exactor walled enclosure for transmitting a fluid pressure generated by the initiator to the exactor pressure chamber. Fluid pressure being introduced into the chamber will first operate the locking means and free the operating rod. The fluid pressure will act upon the piston next and move the operating rod sufficiently to initiate operation of the mechanical device with which it is connected. The directing means comprises any suitable tubing which is capable of transmitting the fluid pressure from the initiator to the exactor.

The novel features of the present invention, as well as additional features and advantages thereof, will be understood better from the following detailed description of a preferred embodiment of the present invention, when read in connection with the accompanying drawings in which:

Fig. 1 is a side view of a cockpit portion of an airplane, illustrating the installation of the preferred embodiment of the present invention therein;

Fig. 2 is an enlarged view, partly in section, of a portion of the apparatus shown in Fig. 1, the view showing portions of the exactor component of the present invention and portions of the apparatus for removing the cockpit canopy;

Fig. 3 is a plan view of the upper end of the initiator shown in Fig. 4;

Fig. 4 is a longitudinal sectional view of the iniator, taken along the line 4—4 of Fig. 3, the parts being shown in their normal, locked positions prior to firing;

Fig. 5 is a view of a portion of the apparatus shown in Fig. 4, the safety pin having been removed and the trigger mechanism being shown in a cocked, ready-to-fire, position, and with the initiator pin unlocked for removal;

Fig. 6 is a view similar to Fig. 5 showing the position of parts immediately prior to actual firing, the initiator pin having been removed;

Fig. 7 is a sectional view of the initiator showing certain details of the cartridge retainer, the view being taken along the line 7—7 of Fig. 4;

Fig. 8 is a sectional view of the initiator showing details of the filter escape path for the expanding gases, the view being taken along the line 8—8 of Fig. 4;

Fig. 9 is a sectional view of that portion of the initiator showing details of the detent arrangement for engaging the initiator pin with the firing pin;

Figure 10:
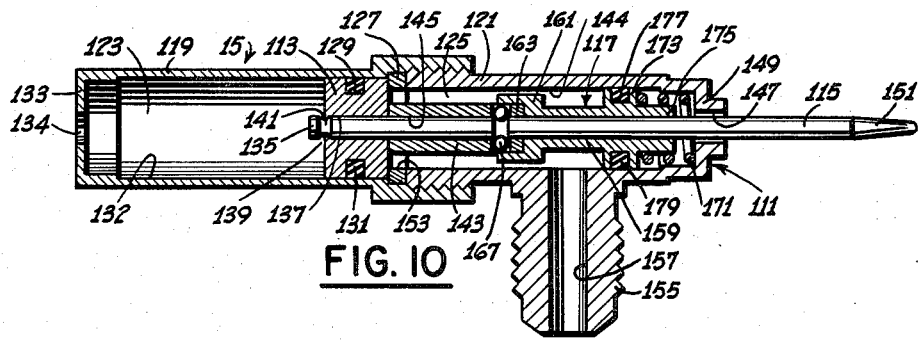
Fig. 10 is a central, longitudinal section of the exactor component of the present invention, the parts being shown in their normal locked position.

Referring more particularly to the drawings, wherein similar reference characters are used to designate corresponding parts throughout, there is shown a preferred embodiment of a system 1 in accordance with the present invention for initiating operation of a mechanical device. For purposes of illustration, the system is shown applied to a thruster or catapult 3 installed in an airplane 5 for the purpose of removing, under emergency conditions, the canopy 7 covering the cockpit opening.

The canopy remover 3 is a pressure responsive device similar to the type more particularly described in applicants' copending application, Serial No. 353,701, filed concurrently herewith now U. S. Patent No. 2,780,961. For producing the necessary motive power in the form of fluid pressure to effect removal of the canopy, an explosive cartridge 9 is employed which is detonated by a spring operated firing pin 11. Under normal circumstances, the firing pin is maintained in a cocked, ready-to-fire position by a safety pin which must be withdrawn either manually or mechanically in order to initiate operation of the canopy remover.

Inasmuch as such a canopy remover is usually located inaccessible to the person operating it, an arrangement is required to effect operation from a remote point convenient to the operator. The system of the present invention fulfills such a requirement and comprises an initiator 13 capable of generating a fluid pressure for, a cartridge actuated fluid pressure responsive single stroke motor device 15, also referred to herein as an exactor, and fluid pressure directing means 17 for transmitting the fluid pressure between the initiator and the exactor.

THE INITIATOR

The initiator 13 comprises a housing 19, an explosive cartridge 21, and a trigger mechanism 23. The housing 19 comprises a walled enclosure, preferably of metal, defining a pressure chamber 25. The housing 19 is made in two parts to facilitate assembly of the cartridge 21 and trigger 23 components therein. The two parts of the housing include the main body portion 27 and a detachable end portion 29 which is threadedly connected to the main body portion. The end 31 of the main body opposite to the detachable end portion is provided with a cylindrical extension 33 which is externally threaded for connection with the fluid pressure directing means 17. The cylindrical extension is provided with a central bore 35 through which fluid pressure developed in the chamber 25 is transmissible or permitted to escape.

For the purpose of accommodating the explosive cartridge 21 and the trigger mechanism 23, a hollow cylindrical retainer or housing 37 is provided. The retainer 37 has one end 39 thereof externally threaded to engage a threaded bore 41 provided in the interior surface of the detachable end portion 29. The threaded bore 41 is centrally located so that the retainer will extend longitudinally along the axis of the initiator housing and within the chamber 25. The retainer 37 is made in two parts which are threadedly engaged adjacent to an interior wall or partition 43 and which divides the interior into separate chambers or compartments 45, 47. The retainer is coextensive with the interior of the walled enclosure 19 by being attached to the detachable end portion 29 at its threaded end 39 and by abutting the end wall 31 opposite thereto at the other end. The retainer portion defining the chamber 45 adjacent to the fluid escape port or opening 35 is arranged to accommodate the explosive cartridge 21 therewithin. The cylindrical wall of the cartridge chamber portion is provided with a plurality of longitudinally extending openings 51 through which expanding gases generated by the cartridge escape into the pressure chamber 25 of the initiator housing 19.

The end 53 of the retainer abutting the end wall 31 of the initiator housing is cut away to provide a plurality of channels or radially extending grooves 55 which merge at the axis of the retainer to provide an escape path for the expanding gases. The channeled retainer end 53 is disposed symmetrically over the outlet opening 35 in the initiator housing 19 so that each of the channels will connect with the opening and provide an effective escape path for the expanding gases. The size of the channels should be such as not to interfere with the transmission of the expanding gases, yet it should be small enough to serve as a filter for any loose material from the cartridge container which might result from detonation of the cartridge and which otherwise might clog the outlet passage provided by the opening 35. In addition to this filtering function, the channeled end provides a circuitous path for the hot expanding gases thereby providing effective cooling of the gases which otherwise might damage the fluid pressure directing means 17 if the gases were permitted to escape directly through the opening 35.

That portion 47 of the retainer which adjoins the cartridge compartment 45 and which is adjacent to the detachable initiator housing end 29 is provided for accommodating the trigger mechanism 23. The interior of the trigger compartment has a stepped bore with the smaller diameter section or bore 57 of the two located adjoining the retainer partition wall 43 and the adjoining larger diameter section or bore 59 located adjacent to the detachable end 29. A firing pin 61 is slidably mounted within the trigger compartment small bore section for movement in an axial direction. The firing pin has a cylindrical portion 63 extending centrally from the main body thereof, the end 65 of which is spherically shaped. The firing pin is disposed with the extension 63 directed toward the cartridge retainer compartment 45. A centrally located opening 67 is provided in the partition wall 43 which is of a size to accommodate passage of the firing pin extension therethrough so that it can impinge the primer 69 of the cartridge in the process of detonation thereof. Obviously, the extension 63 should be of a length sufficient to penetrate the partition wall and impinge against the primer 69.

A compression spring 71 is disposed between the firing pin and the interior wall 73 of the detachable end 29 for producing the force necessary to drive the firing pin 61 against the primer 69.

An initiator pin 75 is attached to the firing pin 61 for effectively moving the firing pin under influence of the compression spring 71 in the process of firing the initiator. The pin 75 is of a size to extend through an aperture 77 provided in the detachable end wall 29 of the initiator housing so that the pin is accessible for grasping by an operator. If convenient, a hole 79 may be provided in the externally disposed end 80 of the initiator pin to facilitate attachment of a lanyard (not shown) or other suitable aid to operate the initiator. The inwardly disposed end 81 of the initiator pin extends into a recess or bore 83 provided in the end 85 of the firing pin. A detent locking means is provided for detachably connecting the initiator pin to the firing pin. The locking means comprises one or more spherical detents 87 which are located in radially extending, cylindrical apertures 89 (Fig. 9) provided in the walls of the firing pin. The wall portion defining the detent receiving apertures 89 adjacent to the recess 83 in the end 85 of the firing pin extends radially inwardly as shown in Fig. 9 of the drawings. The initiator pin end 81 disposed within the firing pin bore 83 is provided with an annular groove 91 which extends circumferentially around the surface thereof and adjacent to the end. The circumferential groove is provided for receiving those portions of the spherical detents 87 which extend into the bore space 89 when the initiator pin end is properly located within the bore.

The stepped bore arrangement of the trigger retainer housing 47 is utilized to advantage with regard to the locking arrangement for detachably connecting the initiator pin 75 to the firing pin 61. The firing pin is disposed in slidable contact with the retainer walls while it is disposed within the small bore 57. In this position, the spherical detents are restricted insofar as movement radially with respect to the axis of the retainer is concerned, and the parts are so arranged that the detents are held within the groove of the initiator pin thereby locking the initiator pin with the firing pin. However, the diameter of the larger bore 59 is such as will allow the detents to move radially outwardly an amount sufficient to effect unlocking the initiator pin and release it from its connection with the firing pin when the firing pin has been moved sufficiently into the larger bore section.

In order to insure against accidental arming of the initiator, a safety locking pin 93 is provided for locking the initiator pin 75 against withdrawal from the initiator housing 19. As shown particularly in Figs. 3 and 4 of the drawings, the pin 93 comprises a bifurcated member one leg 95 of which is relatively straight for disposal through an aperture 97 provided in the wall portion 99 extending from the detachable end 29. The initiator pin is provided with a circumferential groove 101 adjacent to its external end 80 which is located in a position which will align with the wall opening 97. Thus, in threading the straight leg 95 through the housing aperture 97 it will engage within the groove 101 and lock the initiator pin in place in the housing. The other leg or bifurcation 103 is curved to extend around the exterior surface of the extension 99 thereby to effectively hold the safety pin in place.

Operation of the initiator

Operation of the initiator may best be explained with reference particularly to Figs. 4, 5 and 6 of the drawings. As shown in Fig. 4 the initiator is assembled, ready for firing, with the safety pin 93 (of which leg 103 is indicated in Fig. 4) in place. An operator must first withdraw the safety locking pin 93 from its engaged position inside to unlock or release the initiator pin 75. The initiator pin is then pulled or otherwise moved in a manner to withdraw it from the initiator housing 19. The initiator pin, being locked to the firing pin 61, will move the firing pin against the compressive force of the spring 71 until the locking detents 87 reach the large diameter bore 59 of the trigger retainer housing 47, the position illustrated in Fig. 5. Upon reaching this position, the detents will be forced radially by the wall of groove 91 outwardly and the initiator pin 75 will be detached or released from the firing pin. The firing pin will then be forced in the direction of the explosive cartridge 21 by the compression spring 71, causing the firing pin extension 63 to penetrate the partition opening 67 and impinge on the primer 69 of the cartridge with sufficient force to detonate the cartridge. The gases from the cartridge will expand through the retainer openings 51 into the initiator chamber 25 and then be transmitted through the filter channels 55 and through the outlet opening 35.

THE EXACTOR

The motor or exactor 15 comprises a housing 111, a piston 113, an operating rod 115 and means 117 for normally restraining the operating rod against movement. The housing 111 comprises a cylindrical, two part, walled enclosure, preferably of metal, defining a chamber which will withstand the fluid pressure necessary to operate the pressure responsive components. The two parts 119, 121 of the housing are threadedly connected at adjoining ends thereof so that their respective cylindrical chambers 123, 125 are axially aligned. A partition or wall 127 separates the chambers one from the other.

The piston 113 comprises a substantially solid cylindrical member having an annular groove 129 provided in the cylindrical outer surface thereof. The piston is mounted for slidable, axial movement within the chamber 123 defined by the piston housing portion 119. An O ring 131 is disposed within the annular groove and resiliently engages the internal walls 132 of the housing defining the piston chamber 123, thereby effecting a fluid tight seal therewith. The end wall 133 of the piston housing portion 119 opposite the partition wall 127 is closed except for an opening 134 extending therethrough, the purpose of which serves as an escape for gases in the chamber 123 which are forced out by operation of the piston.

The operating rod 115 is attached by any suitable means to the piston 113 which will dispose the rod axially of the exactor housing. As shown in Figs. 10 through 13, one end 135 of the rod extends through a central aperture 137 provided in the piston and the edges 139 of the aperture are crimped or otherwise forced into an annular groove 141 adjacent the rod end to secure the two members together. A portion 143 of the partition wall 127 is arranged to extend into the other chamber 125 of the housing 111 in spaced relation to the internal walls 144 thereof. The partition extension is cylindrical and is provided with a central bore or aperture 145. The operating rod 115 extends through and is slidable within the partition extension aperture 145 so that the extension serves as a guide for the rod. The rod extends through the chamber 125 and through an aperture 147 provided in an end wall 149 of the housing. The opposite or free end 151 of the rod extends beyond the housing an amount sufficient to operatively connect it with apparatus it is intended to control.

That portion 121 of the housing which defines the chamber 125 functions as a cylinder for receiving fluid pressure necessary to operate the piston 113. The partition wall is provided with a plurality of apertures 153 which will transmit fluid pressure from the receiving chamber 125 into the piston chamber 123 to effectively operate the piston. The pressure chamber section 121 of the housing is provided with a lateral extension 155 which has a central bore 157 for transmitting fluid pressure into the receiving chamber. The extension is externally threaded to facilitate connecting the fluid pressure directing means 17 thereto.

For the purpose of locking the operating rod 115 against movement until intention to do so, locking means 117 comprising a fluid pressure responsive arrangement is provided. The locking means comprises a sleeve 159 disposed around the operating rod 115 between the partition extension 143 and the end wall 149 of the housing through which the rod extends. The sleeve is arranged for independent slidable movement along the rod. The end portion 161 of the sleeve adjacent to the extension 143 is dimensioned to slidably fit over an adjacent end portion 163 of the extension. A plurality of radially extending apertures 165 are provided in the extension end portion 163 which is covered by the sleeve portion 161. A spherical detent 167 is disposed in each of the radial apertures 165. The operating rod 115 is provided with an annular groove 169 disposed in the outer surface thereof and at a point oppositely located from the radial apertures when the rod is fully extended from the housing, in the manner more particularly shown in Fig. 10 of the drawings. The detents 167 are of a size to extend partly within the rod grooves 169 thereby to lock the operating rod against movement with respect to the housing. The detents are retained in this locked position by the sleeve portion 161 which covers the apertures 165, in much the same manner that the locking detents 87 of the initiator 13 function.

In order to maintain the sleeve 159 in a normal position for holding the detents in a locking position, a compression spring 171 is provided. The spring is disposed between the end wall 149 of the exactor housing and a lateral extending shoulder 173 provided adjacent to the end 175 remote from the extension 143. The spring is arranged to exert a compressive force against the shoulder. The lateral shoulder 173 is provided with an annular groove 177 on its cylindrical outer surface for receiving an O ring 179' The sleeve O ring is in fluid tight relation with the cylindrical walls of the chamber 125, so that the sleeve will operate as a piston. The sleeve end 175 remote from the partition 127 is disposed normally at a spaced distance from the end wall 149 so that it can be moved in the direction of the end wall an amount sufficient for its opposite end portion 161 to clear the apertures 165, as particularly shown in Fig. 11 of the drawings, thus leaving the detents free to move outwardly and releasing the operating arm.

Operation of the exactor

Figure 11:
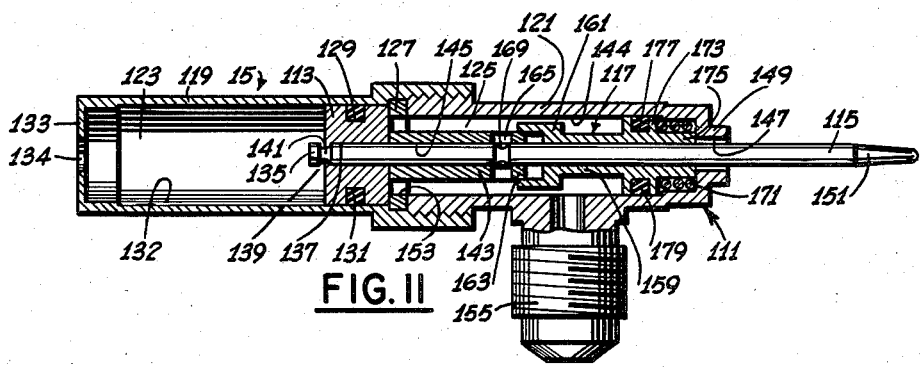
Fig. 11 is a view, similar to Fig. 10, showing the operating rod unlocked ready for movement to a retracted position.
Figure 12:
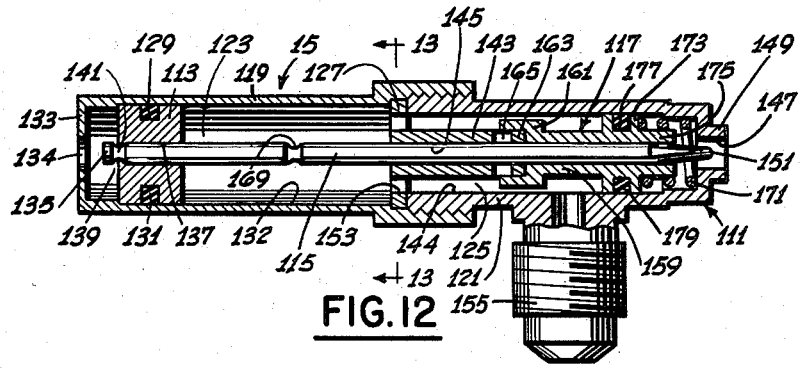
Fig. 12 is a view, similar to Figs. 10 and 11, showing the operating rod retracted.
Figure 13:
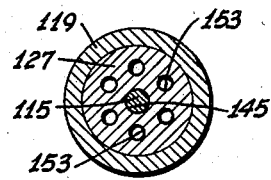
Fig. 13 is a sectional view of the initiator, taken along the line 13—13 of Fig. 12.

Figs. 10 through 12 of the drawings illustrate successive stages in the operation of the exactor 15. The exactor is normally maintained and set in a locked position ready to operate with the parts arranged as shown in Fig. 10. In this position, the piston 113 is located adjacent to the partition wall 127 with the end 151 of the operating rod 115 fully extended from the exactor housing 111. The detents 167 are in locked position with the sleeve 159 covering the apertures 165 to prevent the detents from being withdrawn from the groove 169 of the operating rod. Thus, the operating rod is locked against movement with respect to the housing.

Upon fluid pressure being transmitted through the extension bore 157 into the pressure receiving chamber 125, the force resulting therefrom will first act upon the locking sleeve 159 to move it against the compressive force of the spring 171. The sleeve will be moved sufficiently to expose the apertures 165 and permit the locking detents 167 to move outwardly. This action will release the operating rod from its locked position whereby the fluid pressure then will be transmitted through the partition wall openings 153 and act upon the piston 113 to move it away from the wall 127. Movement of the piston in this direction will cause corresponding movement of the operating rod and cause it to be retracted into the pressure chamber portion 121.

FLUID PRESSURE DIRECTING MEANS

The system proposed by the present invention is designed with the idea that the initiator is adaptable for location in a position convenient to an operator while the exactor is located in a position remote from the initiator. Under such circumstances, it is necessary to provided a fluid pressure directing means 17 which will transmit the fluid pressure produced by the initiator 13 to the exactor 15.

Accordingly, it is found advantageous to employ either a rigid or a flexible conduit 181 for such a directing means. The conduit or tubing may be of any suitable kind which will withstand the fluid pressure being transmitted and which will not be readily subject to collapse or kinking and hence interfere with proper functioning of the apparatus.

Figure 14:
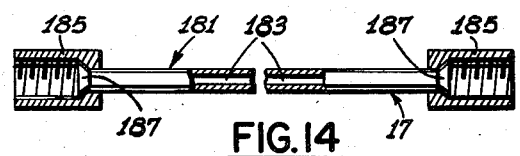
Fig. 14 is a side view, partly in section and partly broken away, of a tubular conductor for transmitting fluid pressure from the initiator to the exactor.

The directing conduit 181, illustarted particularly in Fig. 14, comprises a hollow metal tube 183 having internally threaded coupling members 185 attached at respective opposite ends 187 thereof. The ends of the tubing are outwardly flanged to mate with complementary flanged end portions of the extensions 33, 155 of the initiator and exactor for effecting a fluid tight seal therewith. The initiator and exactor extensions are externally threaded to mate with the coupling members 185 thereby to securely connect the fluid pressure directing means with the initiator and exactor.

THE ACTUATOR SYSTEM AND ITS OPERATION

Referring now to Fig. 1 of the drawing, the system of the present invention is shown, for illustrative purposes, applied to a thruster or catapult for a canopy remover 3 for an airplane. The initiator 13 is attached to the side of an aviator's seat 189, in a position which is convenient for the aviator to withdraw the safety pin 93 and to pull the initiator pin 75 from the initiator housing 19. The exactor 15 may be attached to the canopy remover apparatus 3 by any suitable means which will permit the operating rod to function in the place of and as a safety pin for the canopy remover. The fluid pressure directing means 17 running between the initiator and exactor is located where it will be out of the way and will not interfere with other equipment.

Operation of the system is as follows. The safety pin 93 is first withdrawn to release the initiator pin 75 of the initiator 13. The initiator pin is then withdrawn from the housing 19 to detonate the cartridge 21, in the manner more particularly described above. Fluid pressure developed by the expanding gases of the cartridge is transmitted into the pressure directing conduit 181 through the housing opening 35. The conduit conducts the fluid pressure into the exactor pressure chamber 121 through the exactor extension opening 157. Pressure introduced into the exactor chamber causes the locking sleeve 159 to move along the operating rod 115 sufficiently to release the detents 167 and the operating rod, whereupon the piston is acted upon, in turn, to retract the operating rod into the exactor housing 111. In so doing, the free end 151 of the operating rod is withdrawn from its position within an opening 191 provided in the firing pin 11 of the thruster or catapult apparatus 3, thereby releasing the firing pin 11 and causing detonation of the catapult cartridge 9 (see Fig. 2).

Summary

From the foregoing description, it will become apparent that the present invention provides an improved, efficient system for initiating operation of a mechanical apparatus remotely located from an operator thereof. The system is one which is readily adapted to confined spaces where transmission of forces by mechanical means would be difficult to control. In addition thereto, the fluid pressure responsive system is quick and positive in operation and is not as readily subject to mechanical failure since adjustment of moving parts is confined to a minimum.

While the present invention has been described as applied to a canopy remover for an airplane, it will be recognized by persons skilled in the art that the system is not limited to such application but may be employed to initiate operation of any type of apparatus which is responsive to a mechanical movement.

Although the present invention has been shown and described with respect to a preferred embodiment, it will also be recognized by those persons skilled in the art that various changes and modifications are possible within the spirit of the present invention. For example, instead of the system being employed to initiate operation of only a single piece of equipment, the fluid pressure directing means could be arranged to divert a portion of the pressure and operate one or more additional exactors, thereby to initiate operation of several pieces of equipment. Also, the exactor might be arranged so that the operating rod functions to apply a push instead of a pull on the apparatus to which it is operatively connected. Other changes of like character will, no doubt, readily suggest themselves to those skilled in the art. Therefore, it is desired that the particular form of the invention shown and described herein shall be considered as illustrative and not as limiting.

We claim:

1. In an apparatus for mechanically moving a load where said apparatus is out of reach of an operator, the combination therewith of the improvement for eliminating the need for mechanical linkage between an operator and a load with changes in direction and friction in said linkage, said improvement including a cartridge actuated thruster for moving a load, a firing pin for said thruster, a lock for said firing pin, a spring for moving said firing pin when unlocked to fire a cartridge and actuate said thruster, a cartridge actuated initiator adjacent said operator for generating fluid pressure, means adjacent said thruster and lock for unlocking said firing pin and including an exactor having a cylindrical casing, said lock being constituted by a pin, said pin being secured to a piston movable in said casing to withdraw said pin into said casing for unlocking said thruster firing pin, an auxiliary piston mounted on said pin axis, a second spring in cooperation with said casing and auxiliary piston and adapted to be compressed on movement of said auxiliary piston oppositely to the first mentioned piston, a fluid pressure line from said initiator to the inside of said casing, and means for securing said locking pin to said casing and said pistons against separation prior to arrival of fluid pressure in said casing, said last mentioned means releasing said pistons in response to the supply of fluid pressure from said initiator through said line to said casing between said pistons and to movement of the auxiliary piston under fluid pressure before release of the first mentioned piston from said casing for its movement for withdrawing said locking pin into the casing from said firing pin for said thruster.

2. In an apparatus for actuating a motor in response to fluid pressure from a cartridge, when said motor is out of reach of an operator and the cartridge may be located adjacent the operator and at the same time there is no need for mechanical linkage between the operator and whatever may be moved by the motor, said apparatus including a cartridge actuated initiator, a motor, and a fluid pressure line connecting the initiator and motor, the combination therewith of the improvement in the initiator for better chilling cartridge discharged gas before it enters said fluid pressure line, said improvement including an outer housing, an inner housing radially spaced from the outer housing but having an end wall contiguous an end wall of said outer housing, a cartridge within said inner housing, said inner housing having elongated openings therein through which gas from said cartridge expands radially outward into a space between said housings, said fluid pressure line being connected to an end wall of the outer housing adjacent which is the inner housing, generally radial filter passageways between end walls of the inner and outer housings and connected to said fluid pressure line, whereby a flame issuing from said inner housing must impinge upon the outer housing, thence impinge upon an end wall of said housing, cooling said flame in each instance and then be further cooled by passage radially inwardly through said filter passageways in cooling contact with both an end wall of said inner housing and an end wall of said outer housing, and side walls of said filter passageways in thermal contact with end walls of the inner and outer housing.

References Cited in the file of this patent
UNITED STATES PATENTS

| | | |
|---|---|---|
| 1,474,377 | Meyers | Nov. 20, 1923 |
| 1,484,304 | Hall | Feb. 19, 1924 |
| 2,172,124 | Gilbert | Sept. 5, 1939 |
| 2,177,044 | Nardone | Oct. 24, 1939 |
| 2,207,635 | Nardone | July 9, 1940 |
| 2,284,640 | Coffman | June 2, 1942 |
| 2,382,872 | Giles | Aug. 14, 1945 |
| 2,417,983 | Holman et al. | Mar. 25, 1947 |
| 2,491,516 | Piggat et al. | Dec. 20, 1949 |
| 2,516,902 | Musser | Aug. 1, 1950 |
| 2,535,820 | Temple | Dec. 26, 1950 |
| 2,541,087 | Musser | Feb. 13, 1951 |
| 2,557,448 | Mathisen | June 19, 1951 |
| 2,579,683 | Labelle | Dec. 25, 1951 |